(No Model.) 2 Sheets—Sheet 1.
G. B. ADAMS.
CUFF BUTTON.
No. 376,500. Patented Jan. 17, 1888.
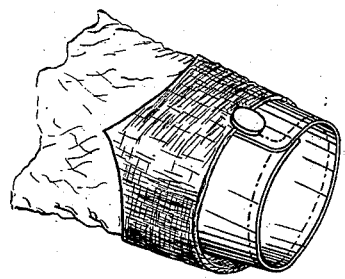
Fig. 1
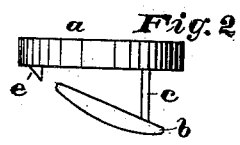
Fig. 2
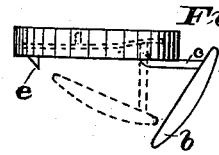
Fig. 3
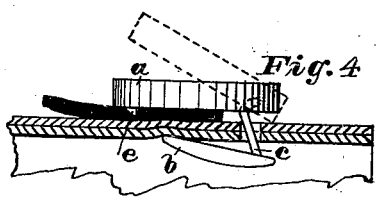
Fig. 4
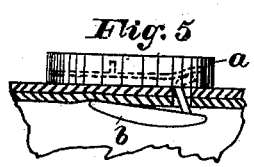
Fig. 5
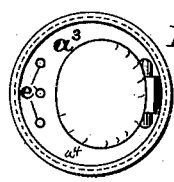
Fig. 6
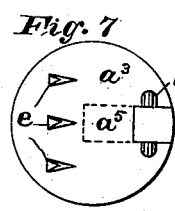
Fig. 7
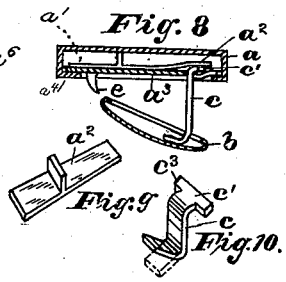
Fig. 8 / Fig. 9 / Fig. 10
Fig. 11
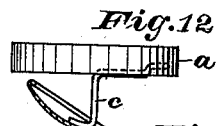
Fig. 12
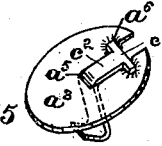
Fig. 15
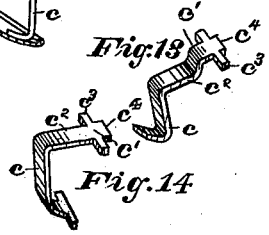
Fig. 13 / Fig. 14
WITNESSES:
INVENTOR:
George B. Adams
BY ATT'YS.

(No Model.) 2 Sheets—Sheet 2.
G. B. ADAMS.
CUFF BUTTON.
No. 376,500. Patented Jan. 17, 1888.
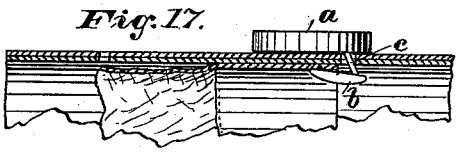
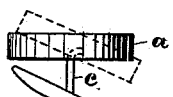
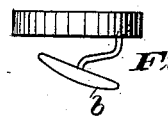
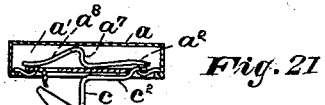
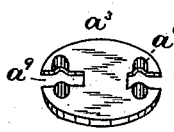
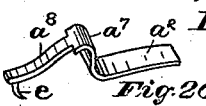
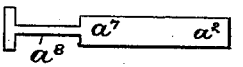
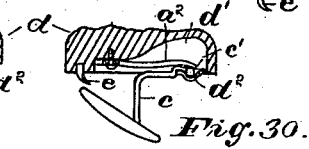
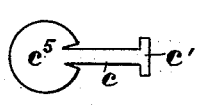
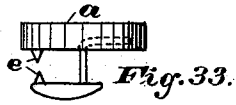
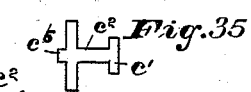
WITNESSES:
INVENTOR:
George B. Adams
BY Campbell & Co. ATT'YS.
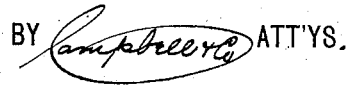

UNITED STATES PATENT OFFICE.

GEORGE B. ADAMS, OF NEWARK, NEW JERSEY, ASSIGNOR, BY DIRECT AND MESNE ASSIGNMENTS, TO THE ADAMS MANUFACTURING COMPANY, OF SAME PLACE.

CUFF-BUTTON.

SPECIFICATION forming part of Letters Patent No. 376,500, dated January 17, 1888.

Application filed December 29, 1886. Serial No. 222,872. (No model.)

*To all whom it may concern:*

Be it known that I, GEORGE B. ADAMS, a citizen of the United States, residing at Newark, in the county of Essex and State of New Jersey, have invented certain new and useful Improvements in Cuff-Buttons; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The general class of inventions to which the devices herein described refers is cuff-buttons and cuff-holders which are used to retain the cuffs in the sleeves of a garment, avoiding thereby the necessity of pinning the same together, as is the usual custom, and also the annoyance caused by the want of any suitable means for fastening the same.

The improvements herein described are designed to provide a device which will effectually perform all the functions of a combined cuff-button and cuff-holder, and which may also be used as an ordinary cuff-button, with nothing to mar the outward appearance thereof, and which, by reason of its construction, will permit of greater variety of design and ornamentation of the button.

In the accompanying sheets of drawings, in which is illustrated the improved device, Figure 1 is a perspective view of the combined cuff-button and cuff-holder and of the cuff and sleeve to which the same is attached. Fig. 2 is a side elevation of the button detached from the cuff, showing the relative position of the clamping head and shoe. Fig. 3 is a similar view illustrating the relative position of said head and shoe when placed for insertion in the cuff, the normal relative position being indicated by dotted lines. Fig. 4 is a side elevation of the button when arranged in holding relation with the cuff and sleeve, which are shown in section in said view; and Fig. 5 is a view in elevation of the button and a section of the cuff, illustrating the button when used as a simple cuff-button. Fig. 6 is a plan of the under side of the button. Fig. 7 is a plan of the lower plate of the button when formed as indicated in Figs. 6 and 8. Fig. 8 is a longitudinal section of the clamping head and shoe. Figs. 9 and 10 are perspective views of the spring and shank, respectively, employed in the button shown in section in Fig. 8; and Fig. 11 is a perspective view of the head and shank, the shoe being omitted and the button turned with the under side uppermost. Fig. 12 is a side elevation of a form of button in which the shank is carried forward to the center of the head. Figs. 13 and 14 are perspective views of different forms of shanks used in the button shown in Fig. 12. Fig. 15 is a similar view of the under plate of the button shown in Fig. 12 and the shank shown in Fig. 14 pivoted in said plate.

On Sheet 2, Fig. 16 is a side elevation of a shank and shoe formed from a single piece of metal. Fig. 17 is a section of a cuff, a portion of the inner sleeve, and an elevation of the button, illustrating the relation of said parts when the button is used to clamp the inner instead of the outer sleeve. Figs. 18, 19, and 20 are side elevations of the button, showing several different constructions thereof. Fig. 21 is a section of a form of button having a yielding tooth. Figs. 22 to 27, inclusive, are views of the several parts used in said button. Fig. 28 is a side elevation of a modified construction of the face of the button, the cuff and sleeve being indicated by dotted lines; and Figs. 29 and 30 are respectively a section of a solid recessed head portion alone and an arrangement of the operative parts of the complete button therewith. Figs. 31 and 32 are respectively a plan of a blank form of shank and shoe formed in one piece and a perspective view of the same when "shaped up." Fig. 34 is a section of a complete button, indicating a peculiar form of shank, shown more in detail in the perspective in views 35 and 36; and Fig. 33 is a side elevation of a form of construction in which the ends of the clamping portions of the head and shoe approach near together without inclining one toward the other.

Similar letters of reference indicate corresponding parts in each of said views.

The essential and elemental features of the combined cuff-button and cuff-holder illustrated in the above-described views are a head portion or face, a, a shoe or back plate, b, and a shank, c, to which said head portion is pivotally attached, said head and shoe being so arranged in relation to each other and the shank that they converge one toward the other, or the clamping ends thereof approach each other when the parts of the button are in their normal relative position when detached from the cuff. This peculiar normal relation of the head and shoe is essential to the proper operation of the said head and shoe in clamping the sleeve and cuff therebetween, as the holding capacity of the jaws or clamping head and shoe portions depends entirely upon the distance between the clamping ends thereof, exercising but little or no pressure when situated relatively as in Figs. 2, 8, 12, &c., and bringing considerable pressure to bear when standing as shown in Figs. 4, 5, and 17, and separated by the interposed sleeve and cuff.

The relation of the head and shoe to the shank may be such that either the head forms a right angle with said shank with the shoe inclining toward said head, as in Fig. 2, or the shoe forms a right angle with said shank with the head inclining toward said shoe, as illustrated in Fig. 18, or said head and shoe may be inclined toward each other at equal or different degrees of inclination, as will be understood. The relative points of attachment of said head and shoe to said shank may vary, either or both being attached centrally, as in Fig. 19, or eccentrically to said shank, as indicated in the majority of said views in the drawings.

The face or head portion a of the button, which comes directly in contact with the outer sleeve, may be of any shape or design, several illustrations of which are shown in the drawings.

The construction shown in Figs. 1 to 12, inclusive, which consists of a casing or chambered head, is advantageous, inasmuch as the cavity $a'$ permits the arrangement and concealment of the spring $a^2$ therein, and that portion or end $c'$ of the shank which projects within the said head and is pivoted therein. In lieu of forming said head into a casing "stamped up" from sheet metal, as in said above-mentioned figures, a solid button, d, (shown in Figs. 29 and 30,) may be used, grooved or recessed in the under side at $d'$ to receive the spring and the end $c'$ of the shank, which is fulcrumed in the plate $d^2$ secured to the button, or is pivotally secured thereto.

While, as above specified, the head may be attached to the shank at the center thereof or out of the center or eccentric thereto and produce a button of practical utility, yet the greatest advantage is attained by pivoting the head portion eccentrically to the shank. By this construction and arrangement the greatest freedom of action in raising or lowering the head portion away from and toward the sleeve and cuff is attained, since but a small portion of the head extends beyond the side of the pivotal point that is depressed, sufficient to hide the shank, and permits of suitable elevation of the clamping end of the head away from the sleeve before the opposite end of said head beyond the pivotal point strikes the cuff, as indicated by the dotted lines in Fig. 4.

As shown in Fig. 19, the shank is pivotally attached to the center of the head; but the movement of the said head is restricted by the length of the same on each side of the pivotal point, and necessitates a much longer shank to permit the requisite movement of the head than is required when said shank is pivoted eccentrically to said head. The advantage of the centrally-pivoted attachment of the shank and head, however, is considerable, particularly when the device is worn simply as an ordinary cuff-button, since by such arrangement the head of the button is caused to lie centrally over the button-hole in the cuff and the appearance thereof is greatly improved thereby. When the function of a sleeve-holder of the button is called into play, the sleeve extends close to the button-hole and the relation of the button to the said button-hole is not made so prominent, and hence the eccentric arrangement of the shank and head may be used without marring the appearance of the button.

While the function of a sleeve-holder constitutes an important feature of the invention, and such forms of construction that tend to cause the more perfect operation of the button for that purpose are desirable, it is also important that the said button shall not be constructed in such a manner to perform the office of a sleeve-holder that its use and appearance as an ordinary cuff-button are injured or spoiled.

As a sleeve-holder it is desirable that the head portion shall move from and toward the sleeve freely and open to such a distance as to permit the ready insertion of the sleeve thereunder, shall seize the sleeve with sufficient force and in such a manner as to hold the same firmly, shall lie on the sleeve parallel with the cuff, and shall expose as little of the shank as possible.

As a cuff-button it is desirable that the head portions shall lie centrally over the button-hole, shall lie flat on or close to the cuff, or approximately so, and shall be so constructed that the design of said head portion may be varied.

The eccentric pivoting of the head and shank, as before mentioned, gives the greatest freedom of movement to the head, and also permits the ready insertion and removal of the sleeve. The peculiar relation of the shoe and head to each other, as hereinbefore mentioned—viz., the inclination thereof one to the other—allows the leveling of the head in relation to the arm, and the use of a short shank and the strength of the spring and the kind of tooth or holding device used determine the firmness with which the sleeve is held under the head.

While these several objects are thus provided for in a sleeve-holder, the central disposition of the button or head over the button-hole, which is desirable in a simple cuff-button, is not attained.

In Figs. 12, 21, 30, &c., is illustrated a form of construction which is designed to accomplish the central arrangement of the head over the button-hole, and also secure the eccentric arrangement of the pivotal point, with the advantages resulting therefrom. In said construction the shank is carried or extended to or toward the center of the head, forming the portion $c^2$, and then projects at right angles therefrom, forming the portion $c$, thereby bringing that portion of the shank which passes through the button-hole under the center of the head. Thus the advantages of the eccentric arrangement of the pivotal point or hinge and the central projection of the shank are combined in one button, which will serve with equal facility as a combined cuff and sleeve holder, or a simple cuff-button.

When the head portion consists of an inclosing shell or casing, $a$, and a bottom plate, $a^3$, held within the shell by the inturned lower edges, $a^4$, thereof, as indicated in Fig. 8, &c., the portion $c^2$ may lie in the space between the plate $a^3$ and the cuff formed by the inturned edges $a^4$, as shown in Figs. 12 and 21, thereby permitting the under side of the button to lie closed and flat on the cuff; or the said plate $a^3$ may be cut away at $a^5$, Figs. 7, 15, and 34, from the pivotal point to the center of said plate, and said portions $c^2$ may lie in said opening thus formed. Indicated more clearly in Fig. 15.)

When the shank is formed to lie in the space between the plate $a^3$ and the cuff, it may be shaped as shown in Fig. 13; but when arranged in the recess or opening $a^5$ it is preferably formed as in Fig. 14. In all of the views in the drawings the shank is hinged or pivoted to the head portion of the button by forming the ends $c'$ with projecting arms or journals $c^3$, which lie in suitable recesses, $a^6$, in the plate $a^3$, the projections $c^4$, extending beyond said journals, being formed thereon or not, according to the amount of leverage required. However, the form and manner of pivoting the shank and head together may be varied from that shown in the drawings, and also the shape of the said shank in cross-section may be changed from the constructions illustrated, as these are features which are susceptible of many variations without departing from the spirit of my invention.

To provide positive means for retaining the sleeve under the head the same may be provided with holding devices, which enter into the sleeve, as indicated in Fig. 4, thereby preventing the withdrawal of the same. Said holding devices or teeth $e$ may project straight out from the lower side of the head next to the sleeve, or may be inclined at an angle, and may either be rigidly attached to the face, as shown in Figs. 8, 30, 33, &c., or may be so constructed as to yield and turn up or away from said lower side of the head, leaving the same free from any projections which will prevent the said lower side of the head from lying close down on the cuff.

In Figs. 21 to 27, inclusive, are shown several forms of construction adapted to secure the desired effect, in which a pivoted or yielding arrangement of a tooth is illustrated, the plate $a^3$ being recessed at $a^9$ to receive the same, or provided with openings $a^{10}$, to allow the projection therethrough of a tooth attached to the end $a^8$ of the spring, as in Fig. 26.

The same spring which engages with the end $c'$ of the shank may be so formed as to co operate with the pivoted tooth, having the spring portions $a^2$ and $a^8$ and the rigid post $a^7$. In Fig. 25 is illustrated a construction of a repressible tooth, in which said tooth is arranged in a small casing having a spiral spring therein, which bears upon the top of the tooth, said casing being secured within the recessed head or button, and the tooth projecting through an opening formed in the bottom plate, as indicated in Fig. 23. The tooth or teeth may also be formed from or secured to the end $a^8$ of the spring $a^2$, as in Fig. 26, and project down from the under side of the button, the spring being rigidly held at the same point between the opposite free ends thereof. In Fig. 27 the free end $a^8$ is provided with a T end, to which one or more teeth may be attached, as desired.

In some instances the tooth may be removed or omitted entirely, and the holding of the sleeve attained solely by the strength of the spring. This is particularly advantageous when the material of the dress is very fine and delicate, and which would become torn by the teeth were they used.

If desirable, the head may be made in imitation of some natural object and the teeth worked in the design, as in Fig. 28, in which the teeth of the walrus are utilized to secure the retention of the sleeve. In Figs. 31 and 32 is illustrated a construction in which the shank or shoe is formed from one piece of metal, the shoe $c^5$ being either left as shown, or covered with a shell, as is the common form of construction.

In order to prevent the possibility of the portion $c$ of the shank drawing up through the button-hole as the head is recessed, when formed as indicated in Figs. 12, 15, 21, &c., a lip or projection may be formed at $c^6$, extending a slight distance over the button-hole.

Instead of providing the head with the holding-teeth to retain the cuff within the outer sleeve, a tooth may be formed upon the shoe, as indicated in Fig. 17, which engages the band of the shirt sleeve.

The arrangement and construction of the spring which is used to cause the head and shoe to seize the material of the sleeve or cuff or to hold the head down upon the sleeve may be varied according to the requirements of the several designs that may be used. When a recessed or chambered head or button, as indicated in Fig. 1, et seq., and Figs. 28 and 30, is used, the spring may be, and preferably is, arranged in said recess or chamber and bears upon the pivotal end of the shank to produce the desired holding-power.

While the inclined arrangement of the head or shoe, or both, with respect to their converging relations to one another when detached from the cuff, which necessitates the spreading apart thereof when in the cuff, and thereby clamps the same, is thought to be the most practical and ornamental construction for this purpose, still the construction shown in Fig. 33 may be used to advantage, in which the head and shoe are parallel, or approximately so, and the shoe caused to approach the head by forming a tooth or lug, $e$, on said shoe.

Having thus described my invention, what I claim as new is—

1. A combined cuff-button and a cuff-holder, consisting of a face or head portion, a shoe or back-plate, and a shank connecting said head and base portion, said head being pivotally attached to said shank, and said head and shoe portions inclining or converging normally one toward the other, and adapted, when the button is inserted in the cuff, to grasp or clamp the material of said cuff and sleeve between the converging ends thereof, and a spring constructed and arranged to cause said shoe and head to grip or seize said material, for the purposes set forth.

2. A combined cuff-button and cuff holder, consisting of an eccentrically-pivoted head portion or face, a shank to which said head is pivoted eccentrically extending from the eccentric pivotal point thereof toward or to the center of said head, and then projecting centrally, or approximately so, from said head, and a shoe or back-plate attached to said shank, said head and shoe portions inclining or converging, normally, one toward the other, and adapted, when the button is inserted in the cuff, to grip or to clamp the material of said cuff and the sleeve between the converging ends thereof, and a spring constructed and arranged to cause the said shoe and head to grip said material, for the purposes set forth.

3. A combined cuff-button and cuff-holder, consisting of a face or head portion provided with one or more holding-teeth projecting therefrom toward the sleeve and constructed and arranged to turn away from the under surface of said head, for the purposes set forth, a shank to which said head is pivotally attached, and a shoe or back-plate, said head and shoe portions inclining or converging, normally, one toward the other, constructed and arranged, when the button is inserted into the cuff, to grip or clamp the said cuff and sleeve between the converging ends thereof, and a spring constructed and arranged to cause said head and shoe to seize and hold the said sleeve, for the purposes set forth.

4. A combined cuff-button and cuff-holder, consisting of a head or button provided with a tooth or teeth on the under side thereof, a shank to which said button is hinged or pivoted, a shoe or back-plate secured to the opposite end of said shank constructed and arranged so as to incline toward or approach the said head, and a spring constructed and arranged to cause the holding contact of said head with the sleeve when adjusted in the cuff, for the purposes set forth.

5. In a cuff-button, the combination of a recessed chambered head or button provided with a tooth or teeth on the under side thereof, a shank to which said button is hinged or pivoted, a shoe or back-plate secured to the opposite end of said shank, constructed and arranged so as to incline toward or approach said head, and a spring arranged in said recessed or chambered head and engaging with the end of the shank pivoted thereto, for the purposes set forth.

6. In a cuff-button, the combination of an eccentrically-pivoted recessed or chambered head or button provided with a tooth or teeth on the under side thereof, a shank to which said head is pivoted eccentrically extending from the eccentric pivotal point thereof toward or to the center of said head and then projecting centrally, or approximately so, from said head, a shoe or back-plate secured to the opposite end of said shank, constructed and arranged so as to incline toward or approach said head, and a spring arranged in said recessed or chambered head and engaging with the end of the shank pivoted thereto, for the purposes set forth.

7. In a cuff-button, the combination of a recessed or chambered head or button, a shank to which said button is hinged or pivoted, a shoe or back-plate secured to the opposite end of said shank, constructed and arranged so as to incline toward or approach said head, and a spring arranged in said chambered head and having oppositely arranged free ends, one of which engages with the end of the shank to which said head is pivoted, and the other free end being provided with a tooth or teeth thereon projecting downward from the under side of said head, for the purposes set forth.

8. In a cuff-button, the combination of a chambered head or button consisting of a casing having an under plate, $a^3$, provided with an opening, $a^5$, extending to or approximately to the center of said casing, a shank pivoted or hinged eccentrically to said casing in said opening, and extending in said opening to or approximately to the center and then bent away from said casing, a shoe or back-plate secured to the end of said shank projecting away from said casing, constructed and arranged so as to incline toward or approach said head, and a spring arranged in said casing and engaging with the ends of said shank pivoted to said casing, for the purposes set forth.

9. In a cuff-button, the combination of an eccentrically pivoted or hinged head or button, a shank to which said head is pivoted and hinged, and extending from the eccentrically-pivoted point to or toward the center of the said head, and then bent away from said head and provided with a projection, $c^6$, at the angle formed by said bent shank, for the purposes set forth, a shoe or back-plate constructed and arranged so as to incline toward or approach the said head, and a spring constructed and arranged to cause the holding contact of said head with the sleeve and cuff when inserted in said cuff, for the purposes set forth.

In testimony that I claim the invention set forth above I have hereunto set my hand this 22d day of December, 1886.

GEORGE B. ADAMS

Witnesses:
FREDK. F. CAMPBELL,
FREDK. C. FRAENTZEL.